(12) United States Patent
Sumiya et al.

(10) Patent No.: US 10,399,149 B2
(45) Date of Patent: Sep. 3, 2019

(54) COMPOSITE POLYCRYSTAL

(71) Applicant: Sumitomo Electric Industries, Ltd., Osaka-shi (JP)

(72) Inventors: Hitoshi Sumiya, Itami (JP); Takeshi Sato, Itami (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 140 days.

(21) Appl. No.: 15/534,859

(22) PCT Filed: Oct. 7, 2016

(86) PCT No.: PCT/JP2016/079917
§ 371 (c)(1),
(2) Date: Jun. 9, 2017

(87) PCT Pub. No.: WO2017/073293
PCT Pub. Date: May 4, 2017

(65) Prior Publication Data
US 2017/0333998 A1  Nov. 23, 2017

(30) Foreign Application Priority Data
Oct. 30, 2015  (JP) ................................. 2015-214041

(51) Int. Cl.
*B23B 27/20* (2006.01)
*C04B 35/52* (2006.01)
(Continued)

(52) U.S. Cl.
CPC .............. *B23B 27/20* (2013.01); *C04B 35/52* (2013.01); *C04B 35/6268* (2013.01); *C04B 35/62675* (2013.01); *C04B 35/64* (2013.01); *C04B 35/645* (2013.01); *B23B 2226/27* (2013.01); *B23B 2226/315* (2013.01); *B23B 2240/08* (2013.01); *B24D 18/0009* (2013.01); *C04B 2235/422* (2013.01); *C04B 2235/425* (2013.01); *C04B 2235/427* (2013.01); *C04B 2235/5445* (2013.01); *C04B 2235/5454* (2013.01);
(Continued)

(58) Field of Classification Search
None
See application file for complete search history.

(56) References Cited

U.S. PATENT DOCUMENTS 4,381,271 A * 4/1983 Hayden .................. B24D 3/06
51/295
4,919,974 A * 4/1990 McCune ................ C22C 26/00
51/293
(Continued)

FOREIGN PATENT DOCUMENTS

JP   H09-142933 A    6/1997
JP   2003-292397 A   10/2003
(Continued)

*Primary Examiner* — Colleen P Dunn
*Assistant Examiner* — Ross J Christie
(74) *Attorney, Agent, or Firm* — Baker Botts L.L.P.; Michael A. Sartori

(57) ABSTRACT

A composite polycrystal contains polycrystalline diamond formed of diamond grains that are directly bonded mutually, and non-diamond carbon dispersed in the polycrystalline diamond, and has a concentration of contained hydrogen of greater than 1000 ppm and less than or equal to 20000 ppm.

8 Claims, 1 Drawing Sheet

(51) Int. Cl.
*C04B 35/64* (2006.01)
*C04B 35/626* (2006.01)
*C04B 35/645* (2006.01)
*B24D 18/00* (2006.01)

(52) U.S. Cl.
CPC .. *C04B 2235/604* (2013.01); *C04B 2235/608* (2013.01); *C04B 2235/656* (2013.01); *C04B 2235/72* (2013.01); *C04B 2235/781* (2013.01); *C04B 2235/785* (2013.01); *C04B 2235/80* (2013.01); *C04B 2235/85* (2013.01); *C04B 2235/96* (2013.01)

(56) References Cited

U.S. PATENT DOCUMENTS

| | | | |
|---|---|---|---|
| 7,749,863 B1 * | 7/2010 | Micovic | H01L 21/76254 |
| | | | 257/E21.122 |
| 2010/0146865 A1 | 6/2010 | Sato et al. | |
| 2014/0026492 A1 * | 1/2014 | Tatsumi | B23B 27/141 |
| | | | 51/307 |

FOREIGN PATENT DOCUMENTS

| | | |
|---|---|---|
| JP | 2005-239472 A | 9/2005 |
| WO | 2009/099130 A1 | 8/2009 |

* cited by examiner

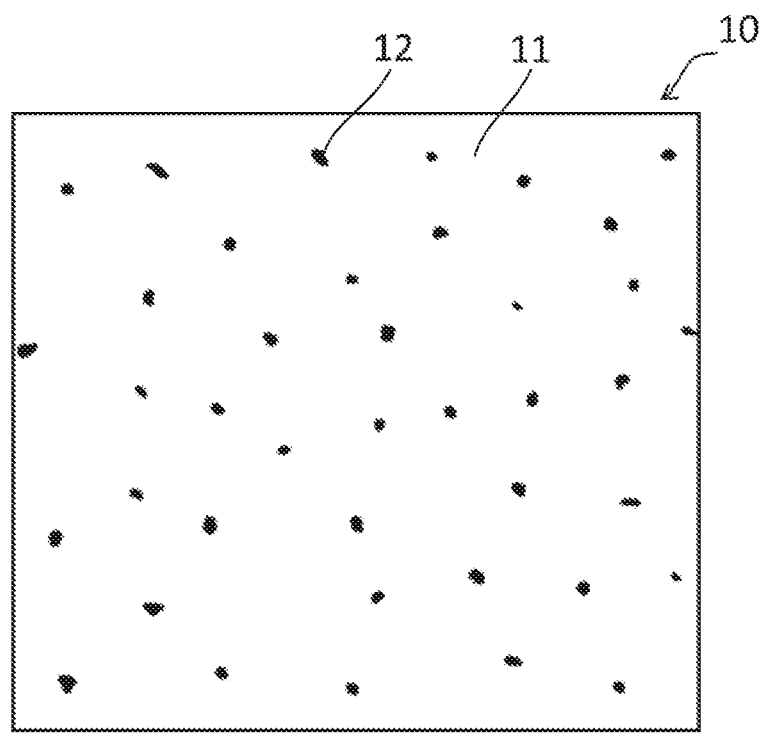

COMPOSITE POLYCRYSTAL

TECHNICAL FIELD

The present invention relates to a composite polycrystal. The present application claims the priority based on Japanese Patent Application No. 2015-214041 filed on Oct. 30, 2015, the entire contents of which are incorporated by reference herein.

BACKGROUND ART

Since diamond is a substance having the highest hardness of the substances existing on the earth, a sintered material or a polycrystal containing diamond is used as a material for an abrasion resistant tool, a cutting tool or the like.

Japanese Patent Laying-Open No. 2003-292397 (PTD 1) discloses a diamond polycrystal composed of diamond that is obtained by conversion and sintering from a carbon substance having a graphite-type layered structure under ultra-high pressure and high temperature without addition of a sintering aid or a catalyst, and that has a mean grain size of diamond of less than or equal to 100 nm, and a purity of greater than or equal to 99%. Also disclosed is a method for producing a diamond polycrystal by direct conversion without addition of a sintering aid or a catalyst by putting a non-diamond carbon substance into a pressure cell equipped with a means for indirect heating, and conducting heating and pressurization.

International Publication No. 2009/099130 (PTD 2) discloses a diamond polycrystal produced by converting and sintering non-diamond carbon under ultrahigh pressure and high temperature without addition of a sintering aid or a catalyst, wherein the sintered diamond grains forming the diamond polycrystal have a mean grain size of larger than 50 nm and less than 2500 nm, and the diamond polycrystal has a purity of greater than or equal to 99% and a D90 grain size of the diamond of less than or equal to (mean grain size+ mean grain size×0.9).

Japanese Patent Laying-Open No. 9-142933 (PTD 3) discloses a diamond polycrystal containing 0.1 to 30% by volume of a substance composed of an oxide and/or a carbonate and/or a carbide of a rare-earth element, and the rest of diamond.

Japanese Patent Laying-Open No. 2005-239472 (PTD 4) discloses a diamond sintered material having high strength and high abrasion resistance, containing sintered diamond grains having a mean grain size of less than or equal to 2 μm, and the rest of a binder phase, wherein the content of the sintered diamond grains in the diamond sintered material is greater than or equal to 80% by volume and less than or equal to 98% by volume; the binder phase contains at least one element selected from the group consisting of titanium, zirconium, hafnium, vanadium, niobium, tantalum, chromium, and molybdenum in a content in the binder phase of greater than or equal to 0.5% by mass and less than 50% by mass, and cobalt in a content in the binder phase of greater than or equal to 50% by mass and less than 99.5% by mass; part or all of the at least one element selected from the group consisting of titanium, zirconium, hafnium, vanadium, niobium, tantalum, chromium, and molybdenum exists as carbide grains having a mean grain size of less than or equal to 0.8 μm; the structure of the carbide grains is discontinuous; and the neighboring sintered diamond grains are bonded to each other.

CITATION LIST

Patent Documents

PTD 1: Japanese Patent Laying-Open No. 2003-292397
PTD 2: International Publication No. 2009/099130
PTD 3: Japanese Patent Laying-Open No. 9-142933
PTD 4: Japanese Patent Laying-Open No. 2005-239472

SUMMARY OF INVENTION

A composite polycrystal of the present disclosure contains polycrystalline diamond formed of diamond grains that are directly bonded mutually, and non-diamond carbon dispersed in the polycrystalline diamond, and has a concentration of contained hydrogen of more than 1000 ppm and less than or equal to 20000 ppm.

BRIEF DESCRIPTION OF DRAWING

FIG. 1 is a schematic sectional view of a composite polycrystal according to one aspect of the present invention.

DESCRIPTION OF EMBODIMENTS

[Technical Problems]

The diamond polycrystal disclosed in Japanese Patent Laying-Open No. 2003-292397 (PTD 1) and International Publication No. 2009/099130 (PTD 2) has such a problem that when it is applied to a wiredrawing die which is an abrasion resistant tool, the pull-out resistance at the time of wiredrawing increases due to local abrasion, and the diameter of the wire after drawing decreases to result in frequent breaking of the wire, and when it is applied to a scribe wheel or a drilling bit which is a cutting tool, the service life of the tool is shortened due to local abrasion or chipping by impact.

The diamond polycrystal or sintered material disclosed in Japanese Patent Laying-Open No. 9-142933 (PTD 3) and Japanese Patent Laying-Open No. 2005-239472 (PTD 4) has such a problem that when it is applied to a wiredrawing die which is an abrasion resistant tool, the coefficient of friction increases due to the contained metal oxide or metal, and the wiredrawing resistance increases and the diameter of the wire after drawing decreases to result in frequent breaking of the wire, and when it is applied to a scribe wheel or a drilling bit which is a cutting tool, the coefficient of friction increases due to the contained metal oxide or metal, and the cutting resistance increases and the service life of the tool is shortened due to the internal breakage caused by the thermal expansion of the contained metal.

As described above, the problem of shortening of the service life of the tool is associated with the abrasion of the diamond polycrystal or sintered material. In light of the above, it is an object of the present invention to provide a composite polycrystal containing polycrystalline diamond and non-diamond carbon, which has high abrasion resistance and is suitably used as a material for an abrasion resistant tool, a cutting tool or the like.

[Advantageous Effects Of Invention]

According to the present disclosure, it is possible to provide a composite polycrystal containing polycrystalline diamond and non-diamond carbon, which has high abrasion resistance and is suitably used as a material for an abrasion resistant tool, a cutting tool or the like. Since the composite polycrystal has high abrasion resistance, it is possible to prevent the service life of the tool from being shortened by abrasion, and it is possible to prolong the service life of the tool.

[Description of Embodiment]

A composite polycrystal which is one embodiment of the present invention contains polycrystalline diamond formed of diamond grains that are directly bonded mutually, and non-diamond carbon dispersed in the polycrystalline diamond, and has a concentration of contained hydrogen of greater than 1000 ppm and less than or equal to 20000 ppm. Since the composite polycrystal of the present embodiment has a concentration of contained hydrogen of greater than 1000 ppm and less than or equal to 20000 ppm, it has high abrasion resistance.

In the composite polycrystal of the present embodiment, preferably, the polycrystalline diamond has a phase that is continuous three-dimensionally. Such a composite polycrystal has higher abrasion resistance.

In the composite polycrystal of the present embodiment, preferably, the diamond grains forming the polycrystalline diamond have a mean grain size of greater than or equal to 10 nm and less than or equal to 200 nm. Such a composite polycrystal has higher abrasion resistance.

In the composite polycrystal of the present embodiment, preferably, the non-diamond carbon has a mean grain size of greater than or equal to 10 nm and less than or equal to 200 nm. Such a composite polycrystal has higher abrasion resistance.

In the composite polycrystal of the present embodiment, preferably, the non-diamond carbon has a percentage in the composite polycrystal in whole of greater than or equal to 0.01% and less than or equal to 5% by an occupancy of the non-diamond carbon calculated as a percentage of an area of the non-diamond carbon in the total area of one arbitrarily specified cross-section of the composite polycrystal. Such a composite polycrystal has higher abrasion resistance.

In the composite polycrystal of the present embodiment, preferably, the non-diamond carbon is graphite. Such a composite polycrystal has higher abrasion resistance.

In the composite polycrystal of the present embodiment, preferably, the non-diamond carbon is amorphous carbon. Such a composite polycrystal has higher abrasion resistance.

Preferably, the composite polycrystal of the present embodiment has a Knoop hardness of greater than or equal to 50 GPa. Such a composite polycrystal has higher abrasion resistance.

The composite polycrystal of the present embodiment contains polycrystalline diamond formed of diamond grains that are directly bound mutually, and non-diamond carbon dispersed in the polycrystalline diamond, wherein the composite polycrystal has a concentration of contained hydrogen of greater than 1000 ppm and less than or equal to 20000 ppm; the polycrystalline diamond has a phase that is continuous three-dimensionally; the diamond grains forming the polycrystalline diamond have a mean grain size of greater than or equal to 10 nm and less than or equal to 200 nm; the non-diamond carbon has a mean grain size of greater than or equal to 10 nm and less than or equal to 200 nm; the non-diamond carbon has a percentage in the composite polycrystal in whole of greater than or equal to 0.01% and less than or equal to 5% by an occupancy of the non-diamond carbon calculated as a percentage of an area of the non-diamond carbon in the total area of one arbitrarily specified cross-section of the composite polycrystal; the non-diamond carbon is either one of graphite and amorphous carbon; and the composite polycrystal has a Knoop hardness of greater than or equal to 50 GPa. Such a composite polycrystal has higher abrasion resistance.

[Detailed Description Of Embodiment]

(Composite Polycrystal)

Referring to FIG. 1, a composite polycrystal 10 of the present embodiment contains polycrystalline diamond 11 formed of diamond grains that are directly bonded mutually, and non-diamond carbon 12 dispersed in polycrystalline diamond 11, and has a concentration of contained hydrogen of greater than 1000 ppm and less than or equal to 20000 ppm. From the view point of reducing the coefficient of friction and/or improving the sliding characteristics for increasing the abrasion resistance, composite polycrystal 10 of the present embodiment has a concentration of contained hydrogen of greater than 1000 ppm, preferably greater than or equal to 1500 ppm, more preferably greater than or equal to 5000 ppm. From the view point of sufficient rigidness, composite polycrystal 10 of the present embodiment has a concentration of contained hydrogen of less than or equal to 20000 ppm, preferably less than or equal to 10000 ppm.

Polycrystalline diamond 11 and non-diamond carbon 12 contained in composite polycrystal 10 are observed with a SEM (scanning electron microscope) or a TEM (transmission electron microscope). In SEM observation or TEM observation, polycrystalline diamond 11 is observed as a bright field, and non-diamond carbon 12 is observed as a dark field.

In polycrystalline diamond 11 of composite polycrystal 10, the phrase "diamond grains are directly bonded mutually" means that diamond grains are mutually bonded in such manner that they come into direct contact with each other, and for example, it means that diamond grains are mutually bonded without being interposed by other grains such as a binder. Mutual direct bonding of diamond grains is observed by SEM observation or TEM observation. Concentration of hydrogen contained in composite polycrystal 10 is measured by SIMS (secondary ion-mass spectroscopy).

From the view point of higher abrasion resistance, in composite polycrystal 10 of the present embodiment, preferably, polycrystalline diamond 11 has a phase that is continuous three-dimensionally. The phrase "polycrystalline diamond 11 has a phase that is continuous three-dimensionally" means that the phase of polycrystalline diamond 11 is a continuous phase that exists continuously without any interruption in a three-dimensional space.

From the view point of higher abrasion resistance, in composite polycrystal 10 of the present embodiment, the mean grain size of the diamond grains forming polycrystalline diamond 11 is preferably greater than or equal to 10 nm and less than or equal to 200 nm, more preferably greater than or equal to 20 nm and less than or equal to 150 nm.

From the view point of higher abrasion resistance, in composite polycrystal 10 of the present embodiment, the mean grain size of non-diamond carbon 12 is preferably greater than or equal to 10 nm and less than or equal to 200 nm, more preferably greater than or equal to 20 nm and less than or equal to 150 nm.

The mean grain size of the diamond grains that form the polycrystalline diamond and the mean grain size of non-diamond carbon in composite polycrystal 10 each mean the diameter of an area equal to the average cross-sectional area of the respective grains.

From the view point of higher abrasion resistance of composite polycrystal 10, in composite polycrystal 10 of the present embodiment, the percentage of non-diamond carbon 12 in composite polycrystal 10 in whole is preferably greater than or equal to 0.01% and less than or equal to 5%, more preferably greater than or equal to 0.1% and less than or equal to 3% by an occupancy of the non-diamond carbon calculated as a percentage of an area of the non-diamond carbon in the total area of one arbitrarily specified cross-section of the composite polycrystal.

The occupancy of the non-diamond carbon phase means the percentage of the area of non-diamond carbon 12 in the total area of one arbitrarily specified cross-section of composite polycrystal 10, and is calculated as the percentage of the area of the phase of non-diamond carbon 12 observed as a dark field, in the sum of the area of the phase of polycrystalline diamond 11 observed as a bright field in observation of one cross-section of composite polycrystal 10 (referred to as one arbitrarily specified cross-section, hereinafter) by SEM or TEM, and the area of the phase of non-diamond carbon 12 observed as a dark field (the sum corresponds to the total area of the cross-section).

From the view point of higher abrasion resistance, in composite polycrystal 10 of the present embodiment, preferably, non-diamond carbon 12 is graphite.

From the view point of higher abrasion resistance, in composite polycrystal 10 of the present embodiment, preferably, non-diamond carbon 12 is amorphous carbon.

From the view point of higher abrasion resistance, composite polycrystal 10 of the present embodiment preferably has a Knoop hardness of greater than or equal to 50 GPa, more preferably greater than or equal to 60 GPa.

From the view point of higher abrasion resistance, composite polycrystal 10 of the present embodiment contains polycrystalline diamond 11 formed of diamond grains that are directly bound mutually, and non-diamond carbon 12 dispersed in polycrystalline diamond 11, wherein composite polycrystal 10 has a concentration of contained hydrogen of greater than 1000 ppm and less than or equal to 20000 ppm; polycrystalline diamond 11 has a phase that is continuous three-dimensionally; the diamond grains forming polycrystalline diamond 11 have a mean grain size of greater than or equal to 10 nm and less than or equal to 200 nm; non-diamond carbon 12 has a mean grain size of greater than or equal to 10 nm and less than or equal to 200 nm; non-diamond carbon 12 has a percentage in composite polycrystal 10 in whole of greater than or equal to 0.01% and less than or equal to 5% by an occupancy of the non-diamond carbon calculated as a percentage of an area of non-diamond carbon 12 in the total area of one arbitrarily specified cross-section of composite polycrystal 10; non-diamond carbon 12 is either one of graphite and amorphous carbon; and composite polycrystal 10 has a Knoop hardness of greater than or equal to 50 GPa.

(Method for Producing Composite Polycrystal)

A method for producing composite polycrystal 10 of the present embodiment is not particularly limited, but from the view point of efficiently producing composite polycrystal 10 having high abrasion resistance at a low cost, preferably, the method includes a material preparing step of preparing non-diamond carbon as a material, and a composite polycrystal forming step of forming composite polycrystal 10 by sintering the material under temperature and pressure conditions under which a diamond phase is formed.

The material non-diamond carbon prepared in the material preparing step may be a powder or a compact. The mean grain size of the powder, or the mean grain size of grains forming the compact is preferably less than or equal to 300 nm, more preferably less than or equal to 100 nm. The material non-diamond carbon may be amorphous carbon such as glassy carbon or carbon black, or non-graphite carbon such as carbon nanotube (CNT) or fullerene (C60, C70, etc.) besides graphite.

From the view point of increasing the abrasion resistance of the obtainable diamond composite polycrystal, the material non-diamond carbon preferably has a concentration of contained hydrogen of greater than 1000 ppm and less than or equal to 20000 ppm. When high-purity graphite is used as the material non-diamond carbon, it is preferred to hydrogenate the high-purity graphite by conducting a heat treatment at several hundred degrees in a hydrogen gas flow or in an ammonia gas flow.

In the composite polycrystal forming step, the sintering conditions are not particularly limited as long as they are the temperature and pressure conditions under which a diamond phase is formed. However, from the view point of efficient formation of the diamond phase and ease of adjustment of the percentage of the phase of the non-diamond carbon, conditions including a temperature of greater than or equal to 1600° C. and less than or equal to 2500° C., and a pressure of greater than or equal to 8 GPa and less than or equal to 15 GPa are preferred. Within these ranges, for example, it is more preferred that the temperature is greater than or equal to 2000° C. and less than or equal to 2500° C. at 9 GPa, the temperature is greater than or equal to 1800° C. and less than or equal to 2400° C. at 12 GPa, and the temperature is greater than or equal to 1800° C. and less than or equal to 2000° C. at 15 GPa. A high temperature and high pressure generating device that generates such a high temperature and a high pressure is not particularly limited, and a belt type, cubic type or blastomere type device can be recited.

EXAMPLES

Examples 1 to 3

Composite polycrystals according to Examples 1 to 3 were prepared in the following manner. As a starting material, a graphite powder having a grain size of 1 μm to 3 μm was ground with a planetary ball mill to prepare an ultrafine graphite powder having a mean grain size of less than 10 nm. After treating the powder for 5 hours at 600° C. in a hydrogen gas flow in a hydrogen heating furnace, the powder was press-molded to prepare a graphite compact having a density of 1.8 g/cm$^3$ (material preparing step). Concentration of hydrogen contained in the graphite compact measured by thermal desorption spectrometry was about 1000 ppm.

Then, the graphite compact prepared as described above was put into a capsule made of high-melting-point metal, and the graphite compact was converted into diamond and sintered by retaining the compact for 20 minutes at a temperature and a pressure shown in Table 1 (the column of "synthesis conditions") by using a high pressure generating device (sintering step). In this manner, a composite polycrystal of each example was obtained.

Examples 4 to 6

Composite polycrystals according to Examples 4 to 6 were prepared in the following manner. As a starting material, glassy carbon, carbon black or C60 having a concentration of contained hydrogen of 3000 ppm to 20000 ppm was prepared, and each of these starting materials was press-molded to prepare a graphite compact having a density of 1.8 g/cm$^3$ (material preparing step).

Then, the compact prepared as described above was put into a capsule made of high-melting-point metal, and the compact was converted into diamond and sintered by retaining the compact for 20 minutes at a temperature and a pressure shown in Table 1 (the column of "synthesis conditions") by using a high pressure generating device (sintering step). In this manner, a composite polycrystal of each example was obtained.

Comparative Examples 1 and 2

Composite polycrystals according to Comparative Examples 1 and 2 were prepared in the following manner. As a starting material, a graphite powder having a grain size of 1 µm to 3 µm was ground with a planetary ball mill to prepare an ultrafine graphite powder having a mean grain size of less than 10 nm. After treating the powder for 5 hours at 600° C. in a hydrogen gas flow in a hydrogen heating furnace, the powder was press-molded to prepare a graphite compact having a density of 1.8 g/cm$^3$ (material preparing step). Concentration of hydrogen contained in the graphite compact was about 1000 ppm.

Then, the graphite compact prepared as described above was put into a capsule made of high-melting-point metal, and the graphite compact was converted into diamond and sintered by retaining the compact for 20 minutes at a temperature and a pressure shown in Table 1 (the column of "synthesis conditions") by using a high pressure generating device (sintering step). In this manner, a composite polycrystal of each comparative example was obtained.

The mean grain sizes of diamond grains of the polycrystalline diamond and non-diamond carbon in the composite polycrystal in each of Examples 1 to 6 and Comparative Examples 1 and 2 obtained in the manner as described above were determined by the following technique. By a contrast analysis by SEM observation or TEM observation of one section of the composite polycrystal, a polycrystalline diamond phase (phase of polycrystalline diamond) and a non-diamond carbon phase (phase of non-diamond carbon) in the composite polycrystal were observed. The fact that the non-diamond carbon in Examples 1 to 3 and Comparative Example 2 was graphite, and the fact that the non-diamond carbon in Examples 4 to 6 was amorphous carbon were recognized by an appearance position and a half-value width of an X-ray diffraction peak in an X-ray diffraction profile measured by a 2θ scanning method using X-ray from Kα rays of Cu as a radiation source. In any of the composite polycrystals of Examples 1 to 6 and Comparative Examples 1 and 2, it was confirmed that diamond grains were directly bonded mutually in the polycrystalline diamond phase in the composite polycrystal, and that the polycrystalline diamond phase was continuous three-dimensionally.

After capturing an image in such a condition that a grain boundary is distinguishable in the SEM observation or TEM observation, an image processing (binarization) was conducted, and an average of areas of diamond grains forming the polycrystalline diamond phase and non-diamond carbon forming the non-diamond carbon phase was calculated. The diameter of a circle having the same area as the determined area was calculated, and the mean grain size of the diamond grains and the mean grain size of non-diamond carbon were obtained.

Moreover, occupancy of the non-diamond carbon in the composite polycrystal in each of Examples 1 to 6 and Comparative Examples 1 and 2 was calculated by 100×(area of non-diamond carbon phase)/{(area of polycrystalline diamond phase)+(area of non-diamond carbon phase)} from the area of the polycrystalline diamond phase and the area of the non-diamond carbon phase.

In addition, concentration of hydrogen contained in the composite polycrystal of each of Examples 1 to 6 and Comparative Examples 1 and 2 was measured by SIMS.

In addition, Knoop hardness of each composite polycrystal of Examples 1 to 6 and Comparative Examples 1 and 2 was measured by a microhardness tester using a Knoop indenter made of diamond at a load of 4.9 N.

Further, abrasion resistance of each composite polycrystal of Examples 1 to 6 and Comparative Examples 1 and 2 was evaluated in the following manner. A sample of a composite polycrystal was worked to have a diameter ϕ of 2 mm and a height of 2 mm, and joined to a sample holder with an active brazing material, and then the sample was worked into a conical shape having a point angle of 120°. At the tip end of the cone, a flat surface having a diameter ϕ of 0.3±0.005 mm which was to be a test surface was formed by skeif polishing, and thus a diamond test piece having a truncated conical shape was prepared. Then, the test piece was attached to the main shaft of the machining center to give a tool, and the test piece was slid while being pressed against an alumina ($Al_2O_3$) sintered plate (grain size: several microns, purity: 99.9%) by applying a constant load to the test piece at an air pressure of 0.3 MPa by using an air cylinder. The size of the $Al_2O_3$ sintered plate was 100 mm×100 mm×0.1 mm, and the track of the tool was set so that the test piece drew a spiral pattern. The moving speed of the tool was 5 m/min, the sliding distance was 10 km, and the sliding time was 2000 min. The expanse of the tip end diameter after the sliding test was measured, and an abrasion loss was calculated. The results are collectively shown in Table 1.

TABLE 1

| | Type of material non-diamond carbon (mean grain size: nm) | Synthesis conditions | | Mean grain size of diamond grains of polycrystalline diamond (nm) | Non-diamond carbon | | | Knoop hardness (GPa) | Result of sliding test against alumina, abrasion loss (×10$^{-4}$ mm$^3$) |
| --- | --- | --- | --- | --- | --- | --- | --- | --- | --- | --- |
| | | Pressure (GPa) | Temperature (° C.) | | Substance | Occupancy (%) | Mean grain size (nm) | Concentration of contained hydrogen (ppm) | | |
| Example 1 | Ultrafine graphite (<10 nm) | 10 | 2200 | 50 | Graphite | 1.5 | 25 | 9700 | 85 | 1.0 |
| Example 2 | Ultrafine graphite (<10 nm) | 11 | 2400 | 150 | Graphite | 0.05 | 120 | 1500 | 105 | 0.6 |

TABLE 1-continued

| | Type of material non-diamond carbon (mean grain size: nm) | Synthesis conditions Pressure (GPa) | Synthesis conditions Temperature (° C.) | Mean grain size of diamond grains of polycrystalline diamond (nm) | Non-diamond carbon Substance | Non-diamond carbon Occupancy (%) | Non-diamond carbon Mean grain size (nm) | Concentration of contained hydrogen (ppm) | Knoop hardness (GPa) | Result of sliding test against alumina, abrasion loss (×10⁻⁴ mm³) |
|---|---|---|---|---|---|---|---|---|---|---|
| Example 3 | Ultrafine graphite (<10 nm) | 12 | 1800 | 15 | Graphite | 10 | 10 | 5500 | 60 | 1.7 |
| Example 4 | Glassy carbon (<5 nm) | 9 | 2100 | 70 | Amorphous carbon | 0.1 | 10 | 7400 | 70 | 1.2 |
| Example 5 | Carbon black (<5 nm) | 9 | 2100 | 50 | Amorphous carbon | 1 | 70 | 5500 | 75 | 1.5 |
| Example 6 | C60 (<5 nm) | 10 | 2000 | 50 | Amorphous carbon | 0.1 | 30 | 8800 | 95 | 0.8 |
| Comparative Example 1 | Ultrafine graphite (<10 nm) | 15 | 2200 | 120 | None | 0 | — | 1500 | 95 | 6.5 |
| Comparative Example 2 | Ultrafine graphite (<10 nm) | 9 | 2600 | 600 | Graphite | 2 | 600 | 400 | 40 | 20 |

Referring to Table 1, as shown in Examples 1 to 6, the composite polycrystal containing polycrystalline diamond formed by direct bonding of diamond grains and non-diamond carbon dispersed in the polycrystalline diamond, and having a concentration of contained hydrogen of greater than or equal to 1000 ppm and less than or equal to 20000 ppm had higher abrasion resistance.

It is to be understood that the embodiment and examples disclosed herein are not restrictive but illustrative in all respects. The scope of the present invention is indicated by claims rather than by the above description, and it is intended that every modification within the equivalent meaning and scope of claims is included in the present invention.

REFERENCE SIGNS LIST

10 Composite polycrystal, 11 Polycrystalline diamond, 12 Non-diamond carbon

The invention claimed is:

1. A composite polycrystal comprising: polycrystalline diamond formed of diamond grains that are directly bonded mutually, and non-diamond carbon dispersed in said polycrystalline diamond, wherein
the composite polycrystal has a concentration of contained hydrogen of greater than 1000 ppm and less than or equal to 20000 ppm, and
said non-diamond carbon has a mean grain size of greater than or equal to 10 nm and less than or equal to 200 nm.

2. The composite polycrystal according to claim 1, wherein said polycrystalline diamond has a phase that is continuous three-dimensionally.

3. The composite polycrystal according to claim 1, wherein said diamond grains forming said polycrystalline diamond have a mean grain size of greater than or equal to 10 nm and less than or equal to 200 nm.

4. The composite polycrystal according to claim 1, wherein said non-diamond carbon has a percentage in said composite polycrystal in whole of greater than or equal to 0.01% and less than or equal to 5% by an occupancy of the non-diamond carbon calculated as a percentage of an area of said non-diamond carbon in the total area of one arbitrarily specified cross-section of said composite polycrystal.

5. The composite polycrystal according to claim 1, wherein said non-diamond carbon is graphite.

6. The composite polycrystal according to claim 1, wherein said non-diamond carbon is amorphous carbon.

7. The composite polycrystal according to claim 1, having a Knoop hardness of greater than or equal to 50 GPa.

8. A composite polycrystal comprising: polycrystalline diamond formed of diamond grains that are directly bonded mutually, and non-diamond carbon dispersed in said polycrystalline diamond, wherein
the composite polycrystal has a concentration of contained hydrogen of greater than 1000 ppm and less than or equal to 20000 ppm;
said polycrystalline diamond has a phase that is continuous three-dimensionally;
said diamond grains forming said polycrystalline diamond have a mean grain size of greater than or equal to 10 nm and less than or equal to 200 nm;
said non-diamond carbon has a mean grain size of greater than or equal to 10 nm and less than or equal to 200 nm;
said non-diamond carbon has a percentage in said composite polycrystal in whole of greater than or equal to 0.01% and less than or equal to 5% by an occupancy of the non-diamond carbon calculated as a percentage of an area of said non-diamond carbon in the total area of one arbitrarily specified cross-section of said composite polycrystal;
said non-diamond carbon is either one of graphite or amorphous carbon; and
the composite polycrystal has a Knoop hardness of greater than or equal to 50 GPa.

* * * * *